US007680734B1

(12) United States Patent
Bent et al.

(10) Patent No.: US 7,680,734 B1
(45) Date of Patent: Mar. 16, 2010

(54) MONEY FUND BANKING SYSTEM

(75) Inventors: Bruce Bent, New York, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 886 days.

(21) Appl. No.: 10/305,439

(22) Filed: Nov. 26, 2002

Related U.S. Application Data

(63) Continuation-in-part of application No. 10/071,053, filed on Feb. 8, 2002, now Pat. No. 7,519,551, and a continuation-in-part of application No. 09/677,535, filed on Oct. 2, 2000, and a continuation of application No. 09/176,340, filed on Oct. 21, 1998, now Pat. No. 6,374,231.

(51) Int. Cl.
*G06Q 40/00* (2006.01)
(52) U.S. Cl. .................. 705/40; 235/379; 235/380; 235/385; 235/437; 235/470; 705/42; 705/45; 705/4; 705/35
(58) Field of Classification Search .............. 705/36–42
See application file for complete search history.

(56) References Cited

U.S. PATENT DOCUMENTS

| 4,232,367 A | 11/1980 | Youden et al. ............. 364/408 |
| 4,346,442 A | 8/1982 | Musmanno ................ 364/408 |
| 4,376,978 A | 3/1983 | Musmanno ................ 364/408 |
| 4,597,046 A | 6/1986 | Musmanno ................ 364/408 |
| 4,674,044 A | 6/1987 | Kalmus et al. ............. 364/408 |
| 4,694,397 A | 9/1987 | Grant ...................... 364/408 |
| 4,700,297 A | 10/1987 | Hagel ...................... 364/408 |
| 4,751,640 A | 6/1988 | Lucas et al. ............... 364/408 |
| 4,774,663 A * | 9/1988 | Musmanno et al. ........ 705/36 R |
| 4,953,085 A | 8/1990 | Atkins ..................... 364/408 |
| 4,985,833 A * | 1/1991 | Oncken ..................... 705/42 |
| 5,126,936 A | 6/1992 | Champion et al. .......... 364/408 |
| 5,206,803 A | 4/1993 | Vitagliano et al. .......... 364/408 |

(Continued)

FOREIGN PATENT DOCUMENTS

JP 10049590 2/1998

(Continued)

OTHER PUBLICATIONS

ABA to Approve System for Sharing Deposit Coverage, American Banker (Feb. 11, 2003).

(Continued)

*Primary Examiner*—Daniel S Felten
(74) *Attorney, Agent, or Firm*—Foley & Lardner LLP

(57) ABSTRACT

Providing interest to clients' deposited funds without the legal limitation on the number of demand withdrawals from deposit accounts is accomplished by an administration system that keeps all of the records for the clients' deposits and withdrawals, calculates the total of the deposits and withdrawals for all clients, and uses the calculation to determine whether funds are deposited to or withdrawn from a single deposit account in which all clients' deposit funds are kept. Clients can make unlimited withdrawals, such as by check, credit card, debit card, or electronic transfer, through the administrator. By placing the administrator as the holder of a single account, legal exemptions to the limitation on earning interest in demand accounts is facilitated.

16 Claims, 2 Drawing Sheets

U.S. PATENT DOCUMENTS

| | | | |
|---|---|---|---|
| 5,220,501 A | 6/1993 | Lawlor et al. | |
| 5,235,507 A | 8/1993 | Sackler | 364/401 |
| 5,262,942 A | 11/1993 | Earle | 364/408 |
| 5,270,922 A | 12/1993 | Higgins | 364/408 |
| 5,291,398 A | 3/1994 | Hagan | |
| 5,297,032 A | 3/1994 | Trojan | 364/408 |
| 5,424,938 A | 6/1995 | Wagner et al. | |
| 5,631,828 A | 5/1997 | Hagan | |
| 5,644,727 A | 7/1997 | Atkins | |
| 5,671,363 A | 9/1997 | Cristofich | 395/237 |
| 5,689,650 A | 11/1997 | McClelland et al. | 705/36 |
| 5,710,889 A | 1/1998 | Clark | 395/244 |
| 5,765,144 A | 6/1998 | Larche | 705/38 |
| 5,774,880 A | 6/1998 | Ginsberg | 705/36 |
| 5,781,654 A | 7/1998 | Carney | 382/137 |
| 5,806,048 A | 9/1998 | Kiron et al. | 705/36 |
| 5,806,049 A | 9/1998 | Petruzzi | 705/36 |
| 5,812,987 A | 9/1998 | Luskin | 705/36 |
| 5,826,243 A | 10/1998 | Musmanno | 705/35 |
| 5,852,811 A | 12/1998 | Atkins | 705/35 |
| 5,864,685 A | 1/1999 | Hagan | |
| 5,878,258 A | 3/1999 | Pizi | 395/682 |
| 5,878,405 A | 3/1999 | Grant et al. | |
| 5,884,285 A | 3/1999 | Atkins | |
| 5,890,141 A | 3/1999 | Carney | 705/45 |
| 5,893,078 A | 4/1999 | Paulson | 705/35 |
| 5,903,881 A | 5/1999 | Schrader et al. | 705/42 |
| 5,905,974 A | 5/1999 | Fraser | 705/37 |
| 5,940,809 A | 8/1999 | Musmanno | 705/35 |
| 5,941,996 A | 8/1999 | Smith | 714/47 |
| 5,946,667 A | 8/1999 | Tull, Jr. et al. | 705/36 |
| 5,950,175 A | 9/1999 | Austin | 705/35 |
| 5,974,390 A | 10/1999 | Ross | 705/4 |
| 5,978,779 A | 11/1999 | Stein | 705/37 |
| 6,014,642 A | 1/2000 | El-Kadi et al. | 705/36 |
| 6,016,482 A | 1/2000 | Molinari | 705/35 |
| 6,026,438 A | 2/2000 | Piazza | 709/221 |
| 6,041,314 A | 3/2000 | Davis | |
| 6,044,371 A | 3/2000 | Person | 707/6 |
| 6,047,324 A | 4/2000 | Ford | 709/227 |
| 6,049,782 A | 4/2000 | Gottesman et al. | |
| 6,052,673 A | 4/2000 | Leon et al. | |
| 6,088,685 A | 7/2000 | Kiron et al. | 705/1 |
| 6,092,056 A | 7/2000 | Tull, Jr. et al. | 705/36 |
| 6,105,005 A | 8/2000 | Fuhrer | 705/35 |
| 6,108,641 A | 8/2000 | Kenna | 705/35 |
| 6,112,191 A | 8/2000 | Burke | |
| 6,119,093 A | 9/2000 | Walker et al. | |
| 6,131,810 A | 10/2000 | Weiss | 235/379 |
| 6,154,770 A | 11/2000 | Kostakos | 709/217 |
| 6,189,785 B1 | 2/2001 | Lowery | |
| 6,226,623 B1 | 5/2001 | Schein et al. | 705/35 |
| 6,317,783 B1 | 11/2001 | Freishtat et al. | |
| 6,374,231 B1 | 4/2002 | Bent et al. | 705/40 |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,133,840 B1 | 11/2006 | Kenna et al. | |
| 7,206,761 B2 | 4/2007 | Colvin | |
| 7,216,100 B2 | 5/2007 | Elliott | |
| 7,376,606 B2 | 5/2008 | Jacobsen | |
| 7,383,223 B1 | 6/2008 | Dilip et al. | |
| 7,440,914 B2 | 10/2008 | Jacobsen | |
| 2001/0032182 A1 | 10/2001 | Kumar et al. | |
| 2002/0007330 A1 | 1/2002 | Kumar et al. | |
| 2002/0069147 A1 | 6/2002 | Sheehan et al. | |
| 2002/0091637 A1 | 7/2002 | Bent et al. | |
| 2002/0128951 A1 | 9/2002 | Kiron et al. | |
| 2002/0161707 A1 | 10/2002 | Cole et al. | |
| 2002/0178098 A1 | 11/2002 | Beard | |
| 2002/0178099 A1 | 11/2002 | Lisser | |
| 2003/0023529 A1 | 1/2003 | Jacobsen | |
| 2003/0135437 A1 | 7/2003 | Jacobsen | |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper et al. | |
| 2004/0138974 A1 | 7/2004 | Shimamura et al. | |
| 2004/0153398 A1 | 8/2004 | Baumgartner et al. | |
| 2004/0162773 A1 | 8/2004 | Del Rey et al. | |
| 2004/0177036 A1 | 9/2004 | Nutahara et al. | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1 | 5/2005 | Bent et al. | |
| 2005/0114246 A1 | 5/2005 | Coloma | |
| 2005/0154662 A1 | 7/2005 | Langenwalter | |
| 2005/0228733 A1 | 10/2005 | Bent et al. | |
| 2006/0047593 A1 | 3/2006 | Naratil et al. | |
| 2006/0106703 A1 | 5/2006 | Del Rey et al. | |
| 2006/0155644 A1 | 7/2006 | Reid et al. | |
| 2006/0167773 A1 | 7/2006 | Yang et al. | |
| 2006/0213980 A1 | 9/2006 | Geller et al. | |
| 2006/0273152 A1 | 12/2006 | Fields | |
| 2007/0043666 A1 | 2/2007 | Burdette | |
| 2007/0118449 A1 | 5/2007 | De La Motte | |
| 2007/0255655 A1 | 11/2007 | Kemper et al. | |
| 2007/0271174 A2 | 11/2007 | Bent et al. | |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1 | 2/2008 | Holm-Blagg et al. | |
| 2008/0065532 A1 | 3/2008 | De La Motte | |
| 2008/0097899 A1 | 4/2008 | Jackson et al. | |
| 2008/0120228 A1 | 5/2008 | Bent et al. | |
| 2008/0133280 A1 | 6/2008 | Ziegler | |
| 2008/0133396 A1 | 6/2008 | De La Motte | |
| 2008/0222053 A1 | 9/2008 | Jacobsen | |
| 2009/0006985 A1 | 1/2009 | Fong et al. | |
| 2009/0012899 A1 | 1/2009 | Friesen | |
| 2009/0138412 A1 | 5/2009 | Jacobsen | |

FOREIGN PATENT DOCUMENTS

| | | |
|---|---|---|
| WO | WO 95/23379 | 8/1995 |
| WO | WO-99/18529 | 4/1999 |
| WO | WO-02/42952 | 5/2002 |
| WO | WO-03/012580 | 2/2003 |
| WO | WO-2005/006111 | 1/2005 |

OTHER PUBLICATIONS

American Banker Online—New Pitch: Deposit Insurance Sharing, p. 1-4 (Jan. 21, 2003).

Blackwell, Rob, "New Pitch: Deposit Insurance Sharing", American Banker Online, Jan. 21, 2003.

Certificate of Deposit Registry Service: Keeping deposits in the corn patch; Banknews/Mar. 2003.

Heavyweight Funding, Bankers News, vol. II, Issue 5, p. 1-2 Mar. 4, 2003.

Promontory Interfinancial Network; http://www.promnetwork.com/index.html (2003).

Mutual Funds Magazine, Bargain Basement Funds, Oct. 1997, 2 sheets.

Mutual Funds Magazine, Bargain Basement Funds, Oct. 1997, 1 Sheet.

Money Fund Report, IBC Financial Data, Inc., Nov. 6, 1998, 1 Sheet.

Liberman et al., Market Watch, "How Important are Banks?" FDIC Insurance on Deposits Just One Continuing Advantage, Oct. 17, 2006, 3 Sheets.

Declaration of Mr. Bruce Bent, II, Vice Chairman and Registrant of Applicant. (3 Sheets) and Exhibits A, B, C and D (6 Sheets).

Britt, Phil; "Struggling with Sweep Accounts", American's Community Banker, v6, n12, p. 18-23, Dec. 1997.

News Article: "Regulators Support Demand Deposit Bill", Regulatory Compliance Watch—Mar. 9, 1998; p. 1; vol. 9, No. 10.

Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Lawsuit by Promontory Interfinancial Network, LLC against Double Rock Corporation p/k/a Reserve Management Corportaion, Island Intellectual Property LLC, Lids Capital LLC and Intrasweep LLC, Amended Complaint, Apr. 15, 2009, Civil Action No. 3:09 CV 217.

Financial Services Industry, "Web Watch: Trading Company Bundles CDs For Better Rates," Community Banker, Jun. 2002, Online http://findarticles.com/articles/mi_qa5344/is_200206/ai_n21313883/.

Letter From Joseph A. DiNuzzo, Counsel, Oct. 20, 1999, FDIC, Federal Deposit Insurance Corporation, 1 Sheet.

Letter From Roger A. Hood, Assistant General Counsel, Jul. 16, 1986, FDIC, Federal Deposit Insurance Corporation, Legal Division, 1 Sheet.

The Depository Trust Company, B#: 3875, Oct. 1, 2002, Settlement/Underwriting, From: Denise Russo, Director, Underwriting, 6 Sheets.

Online, www.usabancshares.com, Brave New World, 1999, 2 Sheets.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Case No. 09 CV 2675.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Case No. 09 CV 2677.

Lawsuit by Promontory Interfinancial Network, LLC against Double Rock Corporation p/k/a Reserve Management Corporation, Complaint, Civil Action No. 1:09 CV 316.

Lawsuit by Promontory Interfinancial Network, LLC against Double Rock Corporation p/k/a Reserve Management Corporation and Lids Capital LLC, Amended Complaint, Civil Action No. 1:09 CV 316.

CMA, Insured Savings Account Fact Sheet, Merrill Lynch, Pierce, Fenner & Smith Incorporated, 1997, pp. 49-57.

CMA, The Investor Credit Line Service, Cost-Effective Financing for the '90s, Merrill Lynch, Pierce, Fenner & Smith Incorporated, 1997, pp. 36-46.

CMA, The Merrill Lynch Cash Management Account Financial Service, Merrill Lynch, Pierce, Fenner & Smith Incorporated, Jan. 1997, 35 Sheets.

Deposit Growth Strategies For Financial Institutions, New Sweep Account Helps Retain $40 Million in Business Deposits, vol. 7, No. 12, The Reserve Funds, May 2001, 1 Sheet.

FDIC Federal Deposit Insurance Corporation, Letter to Mr. Ronald Rexter, Feb. 28, 2003, From Michelle M. Borzillo, Counsel Supervision and Legislation Section, 2 Sheets.

Finistar, Providing FDIC Insured Funds as a Stable Source of Deposits to Commercial Banking Institutions, 16 Sheets, www.Finistar.com.

Frost Bank, Member FDIC, Checking Accounts, 1 Sheet, Sep. 19, 2003, https://www.frostbank.com/cgi-bin/ecomm/frost1/scripts/products/product_detail.jsp?BV . . . .

In The Know, Important Information About Your Account, Smith Barney Citigroup, 2005, 6 Sheets.

Merrill Lynch Announces Beyond Banking, The Power of Advice For Smarter Cash Management, Jan. 8, 2 Sheets.

Merrill Moves CMA Cash to Bank, Street Talk, On Wall Street, Nov. 2000, p. 26.

Money Fund Report, Insured Cash Sweep Options Proliferate, Friday, Jun. 1, 2001, The Reserve Funds, 1 Sheet.

Money Fund Report, Bank of New York Adds Insured Sweeps Option, Friday, May 3, 2002, the Reserve Funds, 1 Sheet.

Money Market Insight's, Goldman Sachs May Create Bank to Offer Insured Cash Sweeps, Aug. 2002 Issue, 3 Sheets.

On Wall Street, Helping Brokers Build A More Successful Business, Usual Products For Usual Times, May 2001, 2 Sheets.

On Wall Street, Helping Brokers Build A More Successful Business, The Power of CASH, Jun. 2002, 2 Sheets.

Sweeping Your Firm Into FDIC Insured Deposits, Harken Financial Services, Aug. 4, 2006, 8 Sheets.

Testimony of Bruce R. Bent, CEO of The Reservce Funds, Before The Financial Institutions and Consumer Credit Subcommittee House Financial Services Committee U.S. House of Representative, Hearing On H.R. 758 and H.R. 859, Mar. 5, 2003, 4 Sheets.

The Reserve Funds, NJBA Endorses New Sweep Account Offers New Jersey Banks Deposit Growth, Retention, For Immediate Release, May 23, 2001, 1 Sheet.

The Reserve Funds, Reserve Management and Irwin Union Bank and Trust Company Partner to Offer The Reserve Return Sweep, For Immediate Release, Mar. 8, 2001, 2 Sheets.

The Unmatched Sweep Solution From The Cash Management Expert, 2 Sheets.

Munk, Merrill Makes New Push Into Traditional Banking, Dow Jones Newswires, Jan. 3, 2003, 1 Sheet.

O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.

Waddell, "Sweeping Clean," Advisor, The Advisor to Advisors, 2 Sheets.

Merrill Lynch & You, "Financial Services The Way You Want, When You Want Them," Jan. 2000 4 Sheets.

Merrill Lynch, Pierce, Fenner & Smith Incorporated, "Information Statement," 2000, 12 Sheets.

12 C.F.R. Part 329—Interest on Deposit, Source: 51 FR 10808, Mar. 31, 1986, 5 Sheets.

Merriam-Webster Online Dictionary, 10th Edition, Definition of "Associated", 2 Sheets.

Merrill Lynch & You, "Financial Services The Way You Want, When You Want Them," Jan. 2000.

Merrill Lynch, Pierce, Fenner & Smith Incorporated, "Information Statement," 2000, 12 Sheets.

Letter to Mr. Jonathan L. Levin, Esq., From Oliver Ireland, Associate General Counsel, Oct. 18, 1996, 2 Sheets.

Letter To Mr. L.P. Fleming, Jr., Esp., From Oliver Ireland, Associate General Counsel, Feb. 7, 1995, 3 Sheets.

Letter To Mr. James E. Creekman, Group Vice Presidnet, From Oliver Ireland, Associate General Counsel, Aug. 1, 1995, 4 Sheets.

Letter to Ms. Brenda L. Skidmore, Senior Vice President, From Oliver Ireland, Associate General Counsel, Aug. 30, 1995, 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets).

Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.

The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.

FDIC Federal Register Citations: Email from Bert Ely to Comments, Mar. 8, 2006, Subject: Large-Bank Deposit Insurance Determination Proposal-RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

U.S. Appl. No. 60/307,815, filed Jul. 27, 2001.

U.S. Appl. No. 60/323,365, filed Sep. 20, 2001.

Letter From William W. Wiles, Secretary of the Board, Board of Governors of the Federal Reserve System, Jun. 22, 1983, 6 Sheets.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Letter from Michael Bradfield, General Counsel, Board of Governors of the Federal Reserve System, Nov. 16, 1984, 4 Sheets.

Board of Governors of the Federal Reserve System, 1984 Fed. Res. Interp. Ltr. LEXIS 56, Nov. 16, 1984, 3 Sheets.

Letter From Oliver I. Ireland, Associate General Counsel, Board of Governors of the Federal Reserve System, Jun. 22, 1988, 5 Sheets.

Board of Governors of the Federal Reserve System, 1988 Fed. Res. Interp. Ltr. LEXIS 141, Jun. 22, 1988, 3 Sheets.

Board of Governors of the Federal Reserve System, 1989 Fed. Res. Interp. Ltr. LEXIS 77, Mar. 14, 1989, 2 Sheets.

Board of Governors of the Federal Reserve System, 1989 Fed. Res. Interp. Ltr. LEXIS 154, Jun. 21, 1989, 2 Sheets.

Board of Governors of the Federal Reserve System, 1990 Fed. Res. Interp. Ltr. LEXIS 94, Feb. 1, 1990, 1 Sheet.

Board of Governors of the Federal Reserve System, 1991 Fed. Res. Interp. Ltr. LEXIS 232, Jan. 30, 1991, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

Board of Governors of the Federal Reserve System, 1994 Fed. Res. Interp. Ltr. Lexis 156, Jun. 24, 1994, 3 Sheets.

CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. LEXIS 314, Oct. 17, 1994, 2 Sheets.

Board of Governors of the Federal Reserve System, 1994 Fed. Res. Interp. Ltr. LEXIS 419, Oct. 14, 1994, 4 Sheets.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_servi, Jan. 19, 2001, 4 Sheets.

Capital Briefs: Corporate Checking Account Relief Sought, American Banker, vol. 162, Jul. 28, 1997, 1 Sheet.

Declaration of Mr. Bruce Bent II, Vice Chairman and Registrant of Applicant. (3 Sheets) and Exhibits A, B, C and D (6 Sheets).

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Britt, "Struggling with Sweep Accounts," America's Community Banker, vol. 6, No. 12, 11 Sheets, Dec. 1, 1997.

Chapelle, "Merrill's Rivals Say They, Too. Offer Services Beyond Banking," Securities Data Publishing On Wall Street, 2 Sheets, Feb. 1, 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Hoffman, "Reserve's FDIC-Insured Account Draws Regionals; But some see little need for insurance," Crain Communications Inc., Investment News, 2 Sheets, Jun. 4, 2001.

Keenan, "Tapping Brokerages for Alternative to CDs," American Banker, The Financial Services Daily, 3 Sheets, Feb. 18, 2004.

Lavine, "Check Out High-Yield Checking Accounts," Broward Daily Business Review, vol. 39, No. 102, 2 Sheets, Apr. 27, 1998.

McReynolds, "The Power of CASH: Ho-hum cash can be great product (and lead to more business) in troubled times," Securities Data Publishing on Wall Street, 3 Sheets, Jun. 1, 2002.

McReynolds et al. "Unusual Products for Unusual Times," Securities Data Publishing on Wall Street, 6 Sheets, May 1, 2001.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

Share, "New Service Skirts FDIC's $100K Limit," Dialog Web Command Mode, 2 Sheets, Jun. 13, 2003, http://www.dialogweb.com/cgi/dwclient.

Smith, "IBAA Won't Push Interest-Bearing Checking For Business; Says Too Few Members Want It," The American Banker, 2 Sheets, Apr. 18, 1996.

Stafford, "New Bank Program Allows $1 Million in Insured Deposits," Dialog Web Command Mode, 3 Sheets, Aug. 24, 2003, http://www.dialogweb.com/cgi/dwclient.

Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.

"Man Bites Dog: Funds Move Into Banking," IBC's Money Fund Selector, 2 Sheets, Nov. 6, 1998.

About iMoneyNet, Inc., About iMoneyNet's Money Funds Division, 4 Sheets, Aug. 21, 2003, http://www.ibcdata.com/about.htm.

"Reverse Ups Insurance Limit On Money Market Account," Thomson Financial Inc., Mutual Fund Market News, 1 Sheet, Aug. 26, 2002.

"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.

The Reserve Fund, Study of U.S. Patent No. 6,374,231, 1 Sheet.

"Bank of Oak Ridge to Offer FDIC Insurance on up to $1.5 Million," Dialog Web Command Mode, 2 Sheets, Sep. 25, 2003, http://www.dialogweb.com/cgi/dwclient.

Reserve Management Corporation, Reserve Insured Deposits, U.S. Appl. No. 76/315,600 Issued.

The Reserve, "What Sets Us Apart," 2 Sheets, Oct. 4, 2006, http://www.ther.com/bank/bank_wsua.shtml.

The Reserve, "Reserve Insured Deposits," 2 Sheets, Oct. 4, 2006, http://www.ther.com/ps/ps_fif.shtml.

The Reserve, "Company History," 3 Sheets, Oct. 4, 2006, http://www.ther.com/aboutus/history.shtml.

The Reserve, "Reserve Insured Deposits Program," 2 Sheets, Oct. 4, 2006, http://www.ther.com/bank/bank_insdep.shtml.

Reserve Insured Deposits, United States Patent and Trademark Office, Reg. No. 2,694,910, Registered Mar. 11, 2003, 1 Sheet.

Bent, "Bruce Bent Makes Money Markey Funds Act Like Bank Accounts," Equity BBDP, Oct. 5, 1998, 3 Sheets.

AB 2011 Assembly Bill - Bill Analysis, Senate Amendments, http://www.leginfo.ca.gov/pub/bill/asm/ab_2001-2050/ab_2011_cfa_20060811_161755_asm_floor.html, 2006, pp. 1-3.

AB 2011 Assembly Bill - Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

AB 2011 Assembly Bill - Chaptered, http://www.leginfo.ca.gov/pub/bill/asm/ab_2001-2050/ab_2011_bill_20060925_chaptered.html, 2006, pp. 1-3.

AB 2011 Assembly Bill - Enrolled, http://www.leginfo.ca.gov/pub/bill/asm/ab_2001-2050/ab_2011_bill_20060816_enrolled.html, 2006, pp. 1-3.

AB 2011 Assembly Bill - History, Complete Bill History, http://www.leginfo.ca.gov/pub/bill/asm/ab_2001-2050/ab_2011_bill_20060925_history.html, 2006, p. 1.

Announcing Changes in Automatic "Sweep" Investment Options, LPL Financial Services, Linsco/Private Ledger, Member NASD/SIPC, 26 Sheets.

California Independent Bankers, ICBA Independent Community Bankers of America, Banker Bulletin, 2006, CIB 16th Annual Convention, vol. 4, issue 6, http://www.cib.org/banker_bulletin.htm.

Dreyfus Insured Deposit Program, Disclosure Statement and Terms and Conditions, Dreyfus A BNY Mellon Company, 8 Sheets.

Dreyfus Insured Deposit Program, Multiple List Program—Effective May 11, 2009, 1 Sheet.

Federal Register: Oct. 9, 1997 (vol. 62, No. 196), pp. 52809-52868. http://www.fdic.gov/news/news/inactivefinancial/1997/fil97111b.html.

Garmhausen, "Matching Small Banks with Large Muni Deposits," American Banker, Online The Financial Services Resource, Oct. 4, 2005, 4 pages, http://www.finstar.com/docs/AmericanBanker.html.

Introducing our MaxSafe CD with up to $700,000 of FDIC Insurance, 4 Sheets.

Lake Forest Bank & Trust Company, Introducing MaxSafe Deposit Accounts with up to $3.75 Million in FDIC Insurance, www.lakeforestbank.com/maxsafe, 2 Sheets.

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Intel-financial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Ring, Niamh, National /Global, "Amex Spans The Globe in Retail Bank Buildup," Nov. 27, 2000, 1 Sheet.

Northbrook Bank & Trust Company, Seven Times the Security of a Normal CD, Introducing our MaxSafe CD, 4 Sheets,.

The Pershing Press, Dreyfus Insured Deposit Program, Issue 2, Aug. 2008, http://www.pershing.com/news/pershing_press/news_466244.html, 1 Sheet.

The Reserve Funds Press Release, "The Reserve Funds and Frontier Bank Partner to Offer Revolutionary Banking Product," 5 Sheets, Aug. 1, 2000.

The Reserve Funds, Objectives, Observations & Strategies For American Enterprises Inv., Oct. 18, 2000, 11 Sheets.

* cited by examiner

MONEY FUND BANKING SYSTEM

The present application is a continuation-in-part of application Ser. No. 09/677,535 filed Oct. 2, 2000, and of 10/071,053 filed Feb. 8, 2002 now U.S. Pat. No. 7,519,551, and a continuation of Ser. No. 09/176,340 filed Oct. 21, 1998 (U.S. Pat. No. 6,374,231 B1); all these applications are incorporated herein by reference in their entireties for all purposes.

BACKGROUND OF THE INVENTION

1. Field of the Invention

The novel system is in the field of account transaction processing and provides an administered money fund banking system that is integrated with an insured deposit account.

2. State of the Art

The Federal Deposit Insurance Corporation ("FDIC") is a federal governmental entity that provides insurance for deposits in most banks and savings institutions in the United States. Bank deposits are insured by the FDIC's Bank Insurance Fund ("BIF") and savings institutions' deposits are insured by the FDIC's Savings Association Insurance Fund ("SAIF"). The rules governing insurance of deposits of institutions insured by the BIF and the SAIF are the same. The FDIC bases insurance coverage on the concept of ownership rights and capacities: funds held in different ownership categories are insured separately from each other, and funds of the same ownership but held in different accounts are subsumed under the same insurance coverage. The amount of insurance covered provided to depositors of each institution insured by BIF and SAIF is the same: $100,000.00 to the owner(s) of the finds in the account(s), including principal and interest.

Title 12, Part 329, of the Code of Federal Regulations ("CFR") specifies that "no bank shall, directly or indirectly, by any device whatsoever, pay interest on any demand deposit." (12 C.F.R. § 329.2.) A "deposit" is any money put into a savings account, a checking account, or time account such as a certificate of deposit. A "demand" account is one from which the owner of the account can demand that funds be drawn and paid elsewhere, either to another account (of the same or a different owner) or to a third party. These payments are typically made via a bank draft or check, or a credit or debit card. A account different than a demand account is an account where all or a fixed amount of the principal must be maintained in the account for a period of time to achieve the particular benefits offered by that account. As stated in this section of the CFR, a "demand deposit" includes any deposit in account under which terms the depositor is authorized to make, during any month or statement cycle of at least four weeks, more than six transfers by means of a preauthorized or automatic transfer of telephone (including data transmission) agreement, order or instruction, which transfers are made to another account of the depositor at the same bank, to the bank itself, or to a third party provided that such an account will be deemed a demand deposit if more than three of the six authorized transfers are authorized to be made by check, draft, debit card or similar order made by the depositor. (12 C.F.R. § 329.1(b)(3).) On the other hand, withdrawals from a deposit account are not deemed to be included within the six transfers permitted for a nondemand account when the withdrawals are made by mail, messenger, telephone (via check mailed to the depositor), automated teller machine, or in person. In essence, unless the funds of a deposit are held in a NOW account (18 U.S.C. 1832(a)), an account in which a depositor has the ability to make at least six transfers will be deemed a demand account and no interest will be payable on the funds therein. Therefore, owners of demand accounts are denied interest on their funds.

SUMMARY OF THE INVENTION

In light of this regulatory scheme, it would be beneficial to provide depositors of demand accounts with interest from the funds on deposit while simultaneously providing unlimited (or at least six) transfers of the funds therein. For example, it would be beneficial to provide such depositors with the ability to deposit funds into the demand account from various sources, and to make payments from the demand account via different instruments, without limitation as to the number of transfers, and still earn interest on the funds in the clients' accounts.

To accomplish these and other objectives, this invention provides a system for managing a plurality of accounts for multiple clients by administering at a banking institution a single insured deposit account in which all of the funds for the insured deposit accounts are held, providing a database having client information for each client's account, administering clients' deposits to and withdrawals from each of their accounts, authorizing whether funds in a particular client's account can be used for each payment requested from that client's account, determining as the net transaction of the sum of the insured money market account deposits and withdrawals from the plurality of insured money market accounts on a regular periodic basis, using the determination of the net transaction to deposit funds to or withdraw funds from the single insured deposit account, distributing interest earned on the single deposit account to each of the clients in proportion to their portion of funds in the deposit account, and updating the database for each client's deposits and authorized demand payments.

DESCRIPTION OF SPECIFIC EMBODIMENTS OF THE INVENTION

The present system will be described with reference to an administrator, which can be brokerage, a bank, or another entity with which clients can institute financial transactions such as deposits and demand payments. The administrator appears to each client as if it were, in part, a bank, by accepting deposits for the client's account and by authorizing (and then making) payments demanded by the client from his account. The funds for all of the clients are pooled into a single fund that is maintained as an insured deposit account at a licensed banking institution. This system is preferably implemented in combination with a brokerage account so that the client can centralize all of his financial needs: deposit of funds; demand orders for payment (checking); payment authorization by debit card; securities transactions; retirement plans; and the like.

The following description of the hardware and software is for exemplification of a working system; other architectures can be fashioned to make the systems and perform the methods claimed herein. The system has been implemented on a mainframe computer (e.g., an IBM Application Starterpac 3000 model A20, which is capable of processing 63 million instructions per second) with an operating system such as OS/390 and MVS/ESA running a relational database (e.g., DB2 type database). The programming languages are IBM COBOL, CICS languages along with IBM's CSP screen generation language. For such a system, memory requirements are satisfied with 768 Gigabytes of storage (preferably, e.g., 1024G with a disk storage and recovery system, such as RAID). Communications generally are run on a mixed SNA and TCP/IP network. Communications with a local area network via a local control unit can be implemented using a token ring. Connection to an internal network has been made via an IBM open systems adapter (OSA) running TCP/IP, which allows File Transfer Protocol (frp) via a firewall. Bisynchronous and synchronous file transfer protocols are made through various dial-up media. Terminal Access runs on an Ethernet local area network, using an SAA gateway, and other gateways (e.g., Cytrix and Netsoft) for remote access. Additionally, several lease lines for several applications and terminal access are supported by the system.

Figure 1:
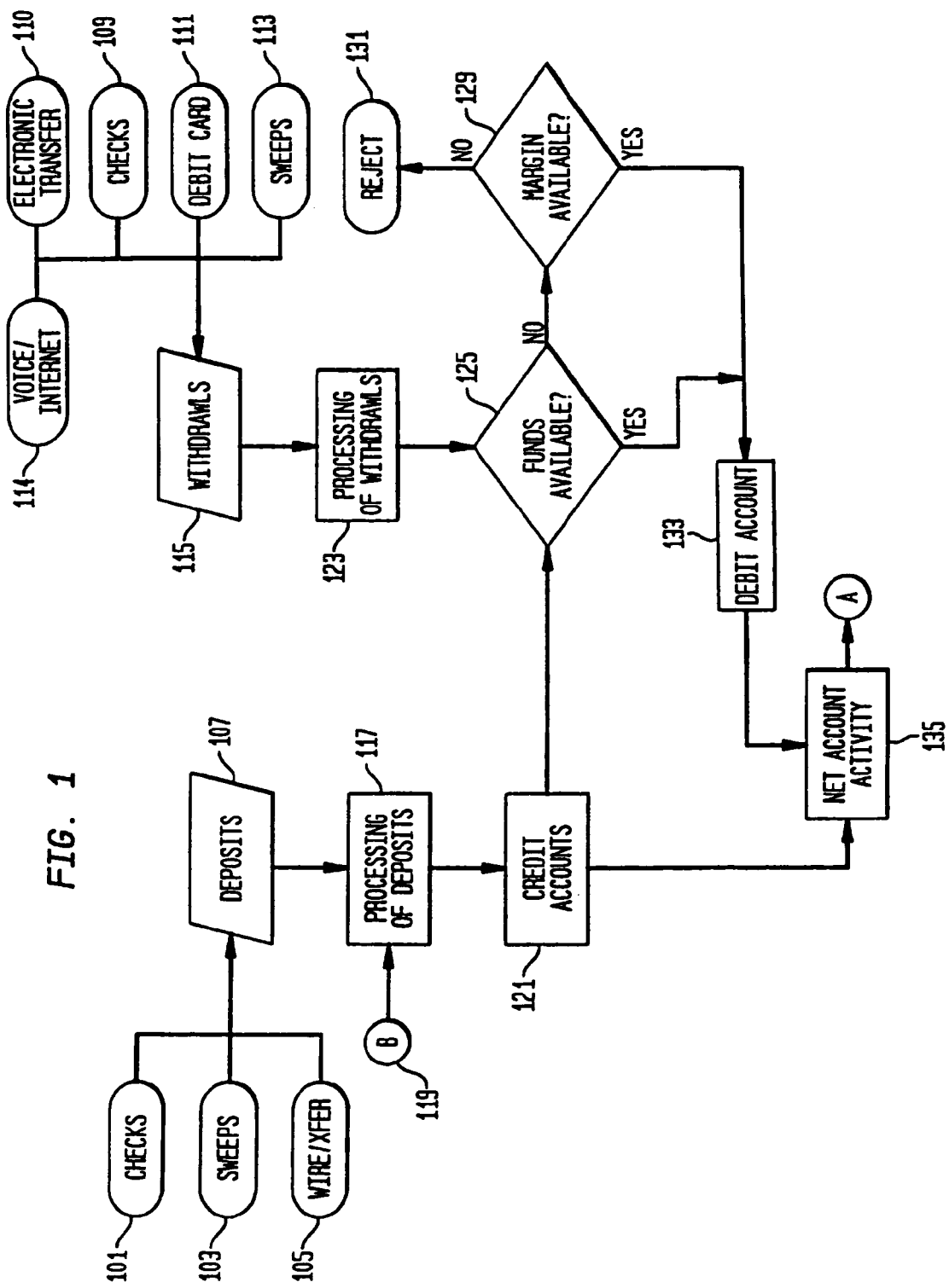
FIGS. 1 and 2 illustrates a flow chart depicting certain processing steps the system follows.
Figure 2:
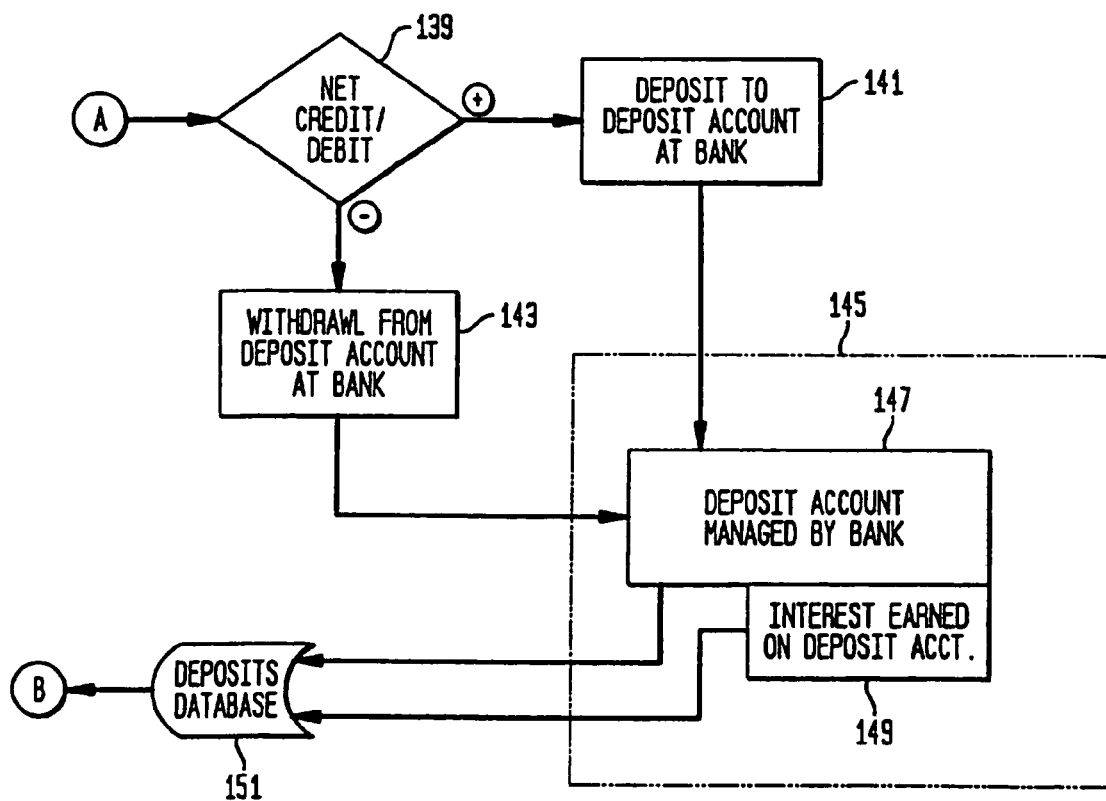

FIG. 1 is a flowchart depicting certain processing steps the system follows at the administrator's end. It should be understood that the order in which these steps are performed may be varied without impairing the achievement of the aforementioned objects of the invention. The client adds funds ("deposits") to his account typically via check 101, sweeps 103 of funds from another account (e.g., a broker/dealer account), and/or by wire and other transfers 105 (such as fed funds wire and direct deposit via ACH) for investment in an FDIC insured money fund account. These funds are deposited in a deposit account with a bank on behalf of the participant. The amount of each of the deposited items is summed 107 to determine the deposits for each client, preferably on a regular periodic basis (e.g., daily) or instantaneously. On the other side, the administrator provides the participant with access to his funds by various methods: payments can be made from funds drawn from the account by check 109; electronic funds transfer 110; debit card 111 authorized by the client (and ACH debit); sweeps of funds 113 to another account (e.g., a broker/dealer account); and electronic and voice access 114 (e.g., internet on-line banking, banking by telephone) for automated transaction requests; and transactions authorized by mail. A "sweep" is a an automated movement of funds between a client's other account (e.g., a broker/dealer account) and his insured deposits account (in either direction). The registration on the other account and the insured deposit account are identical; there is a one for one relationship between the brokerage account and the insured deposits account.

The sum of the deposits is processed 117 with information 119 from a database (described later) that stores information about the demand account for each client. Each client's account is credited 121 with the sum of the deposits for that particular account, which may amount to zero on a particular day. Similarly, the sum and of withdrawals are processed 123 to determine what should be debited from the account, which may also amount to zero on a particular day. The deposits and withdrawals for each account during a given period are compared 125 to determine whether sufficient funds are present in the client's account, including the added funds, to pay the withdrawals requested by the client. In other words, processing determines which client accounts to credit or debit for the various transactions (sweep, checks, debit cards, ACH, etc.) received each business period (e.g., daily). These transactions can be received from one or more sources, such as brokerage firms (sweep transactions), banks (deposits made by wire transfer, checks presented for payment, ACH, debit card transactions), the mail (check deposits, redemption requests), and telephone requests. "Telephone" requests can be performed by voice, conversing with an operator/broker or a voice response system, or via a touch-tone phone using a menu system, or electronically via the internet using email or the World Wide Web (e.g., a web page, preferably secure, onto which users can log in and conduct on-line banking). The final step in the day's processing is to determine the net credit or debit for the deposit account at the bank; the net activity represents all transactions that were processed that day for all insured deposit accounts.

If sufficient funds are not available for drafts and other orders to pay, the requested withdrawal(s) are denied and the client's total account information is again accessed to determine 129 if the client has sufficiently available margin to cover the requested withdrawal(s) (other than, preferably, sweep transactions). If insufficient funds and insufficient margin are available, then the requested withdrawal is denied 131. The client's margin typically is determined by the value of the client's funds held in the client's broker/dealer (securities) account. When sufficient funds are available in the insured deposit account, or a sufficient margin is available in the client's securities account with the administrator, then a debit is made 133 to the client's insured deposit account in the amount of the withdrawal(s) allowed (based on the funds and margin then available) and the processed and authorized withdrawals are paid as directed by the client. The sum of the processed credits 121 and the processed debits 133 are determined for all of the administrator's clients to arrive at a net account activity determination 135. The order in which credits and debits are processed depends upon a subjective protocol and/or operation of law. For example, transactions that are pre-approved (such as authorized debit card transactions, and sweeps) are likely to be processed when received; transactions requiring authorization or acceptance by a third party (such as a bank draft or check) may be credited to the insured deposit account but not available for withdrawal until authorization or acceptance.

The net account activity determination 135 is then used to determine a net credit/debit 139 for the single deposit account held at the bank that contains all of the funds of all of the administrator's clients; the deposit account must be debited or credited to account for all clients' deposits and withdrawals during the period. If the net result is positive (e.g., amount of deposits processed minus amount of authorized withdrawals processed is positive), then the calculated amount is deposited 141 to the single account. If the net result is negative (e.g., amount of deposits processed minus amount of withdrawals processed is negative), then the calculated amount is withdrawn 143 from the single deposit account. An individual insured money market account is maintained for each client on a administrator's database. Each transaction received for an account is individually posted against the client's account on the database. Funds are exchanged between the appropriate parties to cover transactions (broker for sweep transactions; bank for debit cards, checks, ACH, etc.). These transactions are posted and settled prior to any activity taking place in the insured deposit account at the bank. In a preferred embodiment, the last movement of finds on each day is the net movement of funds (credit or debit) that takes place in the deposit account at the bank. The sum of the account balances (principle plus interest) for clients participating in the this system equals the balance in the deposit account at the bank.

The information from the calculations of a net credit/debit 139 are used to implement the processing of the actual deposit or withdrawal (141, 143) to the deposit account, and that information (and funds, if required) is sent to the bank 145 to execute the actual deposit or withdrawal required. If the deposit account is to be credited, then deposits are transferred to the bank and credited to the deposit account 147; conversely, if funds are to be withdrawn from the deposit account, a bulk withdrawal is made from the deposit account to account for the withdrawals that have been authorized from the clients' accounts; in essence, the withdrawal from the deposit account need only make up the difference between the authorized withdrawals and the deposits. If the client wishes to use his excess margin buying power for overdraft protection, the broker/dealer transmits the client's available margin line to the administrator regularly (preferably daily). The available margin line will be taken into consideration when checks, debit card, and other draft and order to pay transactions (e.g., ACH debits, on-line banking withdrawals, and other electronic payments) are processed. If the client's margin line is used to process a check or debit card transaction, a loan will be created and transmitted to the broker dealer by the administrator. Preferably, the broker dealer maintains the margin loan on his system and will pay the administrator for all funds advanced. Using this methodology for margin accounts, there is no effect on the deposit account at the bank.

The bank pays interest 149 on the single deposit account to the administrator. Based on the amount of each client's funds in the deposit account as a function of the total amount in the deposit account, the administrator determines the interest amount (if any) each client is owed (based also on the period during which the interest was determined on a particular account balance). Because all of the clients' funds are in a single account under the name of the administrator, the administrator earns the interest and distributes the interest earned to each of the clients. Further, the limitation on transfers from a interest-bearing account is inapplicable to the clients because their funds are held by the administrator in a demand account and interest for the client is determined only on that portion of those funds maintained in the bank's deposit account. Preferably, if necessary, the administrator makes any withdrawals from the deposit account in person.

After the deposit account has been credited or debited in accordance with the determination for that period of the sum of the deposits and withdrawals from clients, and the interest earned on the single deposit account, this information is transferred back to the administrator's deposits database 151. This database includes information about each client (such as name, address, and other important or desired demographic and tax information about each client's account), as well as financial information regarding the client's holdings on deposit in the bank (i.e., that client's portion of the single deposit account) and holdings with the administrator (e.g., securities and the like).

As seen, the administrator maintains several relationships that provide services for the insured money market accounts. These various entities provide transaction data that is transmitted to the administrator and processed. Preferably, the administrator is it's own transfer agent and provides a shareholder accounting system. Preferably, accounts may be opened through a broker dealer that is a client of the administrator, or directly with an application and check.

The administrator may allow a client with an account under the present system to access his funds by check or with a debit card; in such a case, the administrator has arranged for these services and maintains these relationships which are separate and apart from the deposit account. Banks that provide check and card services will transmit a file each day to the administrator that contains the checks presented for payment and/or the debit card transactions. The transactions that apply to his account under the present system are out sorted and processed against the administrator's database. The administrator will settle with each bank for the transactions that were processed.

The administrator may accept direct deposit of payroll, social security, or pensions for accounts. The clients' accounts are updated as these files are received and processed. The administrator may also accepts ACH debit transactions, which are initiated by the client's bank or a third party at the client's request.

The administrator may also provide the participants with automated bill paying services. Participants preferably provided with a touchtone bill paying system and/or an internet on line banking service. Bill payment requests may be downloaded each morning for processing.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A method for managing a plurality of client accounts for a plurality of clients, comprising:

accessing, by one or more computers, a database comprising information for each client account that has client account funds aggregated with funds of a plurality of other of the client accounts and are held in one or more FDIC-insured and interest-bearing aggregated deposit accounts held in one or more FDIC insured banking institutions, with the information for each of the client accounts including information on each client's funds held in said one or more insured and interest-bearing aggregated deposit accounts; and administering, by the one or more computers, deposits to and withdrawals from each of a plurality of said client accounts, including more than six withdrawals in a month from each of a plurality of the client accounts, with one or more of said withdrawals made by debit card;

determining, by the one or more computers, on a regular basis one or more net transactions as sums of said deposits to and withdrawals from said client accounts;

determining, by the one or more computers, from said net transactions whether to deposit funds to or withdraw funds from said one or more FDIC-insured and interest-bearing aggregated deposit accounts;

making or having made more than six withdrawals in a month of funds from one of the FDIC-insured and interest-bearing aggregated deposit accounts via at least one intermediate bank that is different from the one or more FDIC insured banking institutions; and updating, by the one or more computers, the database with deposits to and withdrawals from said each client account.

2. The method of claim 1, further comprising after accrual in the aggregated deposit account, distributing interest, by the one or more computers, to each of the client accounts in dependence on a balance of that respective client account held in the one or more FDIC-insured interest-bearing aggregated accounts.

3. The method of claim 1, further comprising receiving a draft or check, credit card, sweeps, wire or electronic transfer from one or more sources that are not performing the method with respect to the plurality of client accounts; and the administering withdrawals from each of the plurality of said client accounts step comprises administering withdrawals received from the one or more sources made by draft or check, credit card, debit card, sweeps, wire or electronic transfer and combinations thereof.

4. The method of claim 1, further comprising holding client account funds from the client accounts of a plurality of different clients in only one FDIC-insured and interest-bearing aggregated deposit account.

5. The method of claim 1, further comprising holding client account funds for at least one of the client accounts in a plurality of the FDIC-insured and interest-bearing aggregated deposit accounts, each of the plurality of aggregated deposit accounts held in a different FDIC insured banking institution.

6. The method of claim 1, further comprising denying, by the one or more computers, a withdrawal transaction from one of the client accounts with funds held in a plurality of the aggregated deposit accounts if that client account does not have sufficient funds to cover that withdrawal transaction, or access to sufficient margin or line of credit.

7. The method of claim 1, further comprising holding client account funds for at least one of the client accounts in a plurality of the different FDIC-insured and interest-bearing aggregated deposit accounts among a fixed plurality of FDIC-insured banking institutions.

8. A method for managing a plurality of client accounts for a plurality of clients, comprising:
   accessing, by one or more computers, a database comprising information for each client account that has client account funds aggregated with funds of a plurality of other of the client accounts and are held in one or more FDIC-insured and interest-bearing aggregated deposit accounts held in one or more FDIC-insured banking institutions, with the information for each of the client accounts including information on each client's funds held in said one or more insured and interest-bearing aggregated deposit accounts; and
   administering, by the one or more computers, deposits to and withdrawals from each of a plurality of said client accounts, including more than six withdrawals in a month by check or debit card or ACH from each of a plurality of the client accounts, with one or more of said withdrawals made by debit card;
   determining, by the one or more computers, on a regular basis one or more net transactions as sums of said deposits to and withdrawals from said client accounts;
   determining, by the one or more computers, from said net transactions whether to deposit funds to or withdraw funds from said one or more FDIC-insured and interest-bearing aggregated deposit accounts;
   making or having made more than six withdrawals in a month of funds from one of the FDIC-insured and interest-bearing aggregated deposit accounts via at least one intermediate bank that is different from the one or more FDIC insured banking institutions; and
   updating, by the one or more computers, the database with deposits to and withdrawals from said each client account.

9. The method of claim 8, further comprising after accrual in the aggregated deposit account, distributing interest, by the one or more computers, to each of the client accounts in dependence on a balance of that respective client account held in the one or more FDIC-insured interest-bearing aggregated accounts.

10. The method of claim 8, further comprising
   receiving a draft or check, credit card, sweeps, wire or electronic transfer from one or more sources that are not performing the method with respect to the plurality of client accounts; and
   the administering withdrawals from each of the plurality of said client accounts step comprises administering withdrawals received from the one or more sources made by draft or check, credit card, debit card, sweeps, wire or electronic transfer and combinations thereof.

11. The method of claim 8, further comprising holding client account funds from the client accounts of a plurality of different clients in only one FDIC-insured and interest-bearing aggregated deposit account.

12. The method of claim 8, further comprising holding client account funds for at least one of the client accounts in a plurality of the FDIC-insured and interest-bearing aggregated deposit accounts, each of the plurality of aggregated deposit accounts held in a different FDIC-insured banking institution.

13. The method of claim 12, further comprising denying, by the one or more computers, a withdrawal transaction from one of the client accounts with funds held in a plurality of the aggregated deposit accounts if that client account does not have sufficient funds to cover that withdrawal transaction, or access to sufficient margin or line of credit.

14. The method of claim 8, further comprising holding client account funds for at least one of the client accounts in a plurality of the different FDIC-insured and interest-bearing aggregated deposit accounts among a fixed plurality of FDIC-insured banking institutions.

15. The method as defined in claim 8,
   further comprising holding some client account funds for at least one of the client accounts in at least one interest-bearing aggregated deposit account that is not FDIC-insured, and further comprising
   maintaining in the database information on the client's funds held in said at least one interest-bearing aggregated deposit account that is not FDIC-insured; and
   determining from said net transactions whether to deposit funds to or withdraw funds from the at least one interest-bearing aggregated deposit account that is not FDIC-insured.

16. The method as defined in claim 1,
   further comprising holding some client account funds for at least one of the client accounts in at least one interest-bearing aggregated deposit account that is not FDIC-insured, and further comprising
   maintaining in the database information on the client's funds held in said at least one interest-bearing aggregated deposit account that is not FDIC-insured; and
   determining from said net transactions whether to deposit funds to or withdraw funds from the at least one interest-bearing aggregated deposit account that is not FDIC-insured.

* * * * *

UNITED STATES PATENT AND TRADEMARK OFFICE
CERTIFICATE OF CORRECTION

PATENT NO. : 7,680,734 B1  Page 1 of 1
APPLICATION NO. : 10/305439
DATED : March 16, 2010
INVENTOR(S) : Bruce Bent and Bruce Bent, II It is certified that error appears in the above-identified patent and that said Letters Patent is hereby corrected as shown below:

Col. 1, line 6, delete "Ser. No. 09, 176,340" and replace it with --Ser. No. 09/176,340--.

Col. 1, line 32, delete "finds" and replace it with --funds--.

Col. 2, line 41, delete "illustrates" and replace it with --illustrate--.

Col. 3, line 42, delete "a".

Col. 3, line 54, delete "and".

Signed and Sealed this

Twentieth Day of April, 2010

David J. Kappos
*Director of the United States Patent and Trademark Office*